(12) United States Patent
Haran et al.

(10) Patent No.: US 7,920,593 B2
(45) Date of Patent: Apr. 5, 2011

(54) METHODS FOR DYNAMIC BANDWIDTH ALLOCATION AND QUEUE MANAGEMENT IN ETHERNET PASSIVE OPTICAL NETWORKS

(75) Inventors: Onn Haran, San Jose, CA (US); Ariel Maislos, Sunnyvale, CA (US); Barak Lifshitz, Moshav Ganey-Yohanan (IL)

(73) Assignee: PMC-Sierra Israel Ltd., Herzliya Pituach (IL)

( * ) Notice: Subject to any disclaimer, the term of this patent is extended or adjusted under 35 U.S.C. 154(b) by 41 days.

(21) Appl. No.: 12/058,711

(22) Filed: Mar. 30, 2008

(65) Prior Publication Data

US 2008/0181248 A1 Jul. 31, 2008

Related U.S. Application Data

(63) Continuation of application No. 10/525,505, filed on Feb. 23, 2005, now Pat. No. 7,633,968.

(51) Int. Cl.
*H04J 3/16* (2006.01)
(52) U.S. Cl. .................. 370/468; 370/416; 370/412
(58) Field of Classification Search .......... 370/229–240, 370/468, 412–425
See application file for complete search history.

(56) References Cited

U.S. PATENT DOCUMENTS

| 6,229,788 | B1 | 5/2001 | Graves | |
| 6,438,134 | B1* | 8/2002 | Chow et al. | 370/412 |
| 6,519,255 | B1 | 2/2003 | Graves | |
| 6,546,014 | B1* | 4/2003 | Kramer et al. | 370/395.41 |
| 6,636,527 | B1 | 10/2003 | Lee | |
| 6,735,211 | B1 | 5/2004 | Karasawa | |
| 6,804,256 | B2 | 10/2004 | Chang | |
| 6,826,193 | B1* | 11/2004 | Peisa | 370/437 |
| 6,973,033 | B1* | 12/2005 | Chiu et al. | 370/230.1 |
| 7,088,729 | B2 | 8/2006 | Wellen | |
| 7,215,678 | B1* | 5/2007 | Ahlfors et al. | 370/412 |
| 7,245,628 | B2* | 7/2007 | Shi | |
| 7,263,101 | B2 | 8/2007 | Kim | |
| 7,457,313 | B2* | 11/2008 | Patrick | |
| 2002/0051455 | A1* | 5/2002 | Lee | |
| 2003/0026290 | A1* | 2/2003 | Umayabashi | 370/468 |
| 2003/0137975 | A1* | 7/2003 | Song | |

FOREIGN PATENT DOCUMENTS

| JP | 11266277 | | 9/1999 |
| JP | 2000296646 | | 10/2000 |
| JP | 2001345814 | * | 12/2001 |
| JP | 2002300180 | * | 10/2002 |
| JP | 2002314564 | | 10/2002 |
| WO | WO9938292 | * | 7/1999 |

* cited by examiner

*Primary Examiner* — Kwang B Yao
*Assistant Examiner* — Kenan Cehic
(74) *Attorney, Agent, or Firm* — Mark M. Friedman

(57) ABSTRACT

In a passive optical network, dynamic bandwidth allocation and queue management methods and algorithms, designed to avoid fragmentation loss, guarantee that a length of a grant issued by an OLT will match precisely the count for bytes to be transmitted to an ONU. The methods include determining an ONU uplink transmission egress based on a three-stage test, and various embodiments of methods for ONU report 700 threshold setting.

6 Claims, 9 Drawing Sheets

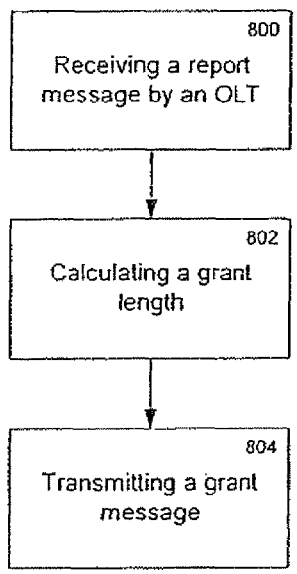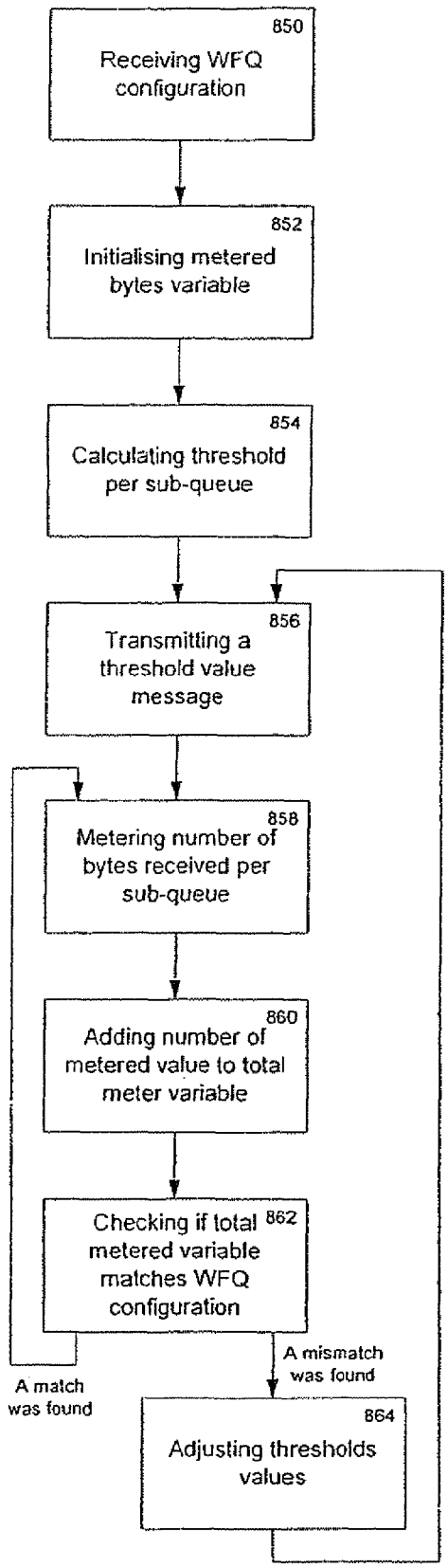
FIG 8 (a)
FIG 8 (b)

METHODS FOR DYNAMIC BANDWIDTH ALLOCATION AND QUEUE MANAGEMENT IN ETHERNET PASSIVE OPTICAL NETWORKS

CROSS REFERENCE TO EXISTING APPLICATIONS

This application is a continuation of U.S. patent application Ser. No. 10/525,505 filed Feb. 23, 2005 now U.S. Pat. No. 7,633,968.

FIELD OF THE INVENTION

The present invention relates generally to data access methods, and more particularly, to methods for optimizing data transmission in Ethernet packet traffic over Passive Optical Network (PON) topologies.

BACKGROUND OF THE INVENTION

The Ethernet PON (EPON) is using 1 gigabit per second Ethernet transport, which is suitable to very high-speed data applications, as well as to converged system support (telephone, video, etc.). The unprecedented amount of bandwidth is directed toward, and arriving from a single entity, the Optical Network Unit (ONU).

An EPON network can be viewed as a distributed switch. An Optical Line Terminal (OLT) manages remotely the transmission of each ONU. The OLT and the ONUs exchange messages. In each cycle of such an exchange, the OLT grants a grant to each ONU, which is answered by a report message from the ONU). The ONU has a queue manager that prepares queue status information, which is transmitted using MPCP messages to the OLT to enable smart management. In other words, the ONU "informs its internal queues status" to the OLT. The OLT management is executed using a Dynamic Bandwidth Allocation (DBA) algorithm. An efficient algorithm is essential to guarantee Quality of Service (QoS), required to fulfill a Service Level Agreement (SLA). Operator revenues will increase from selling sophisticated SLAs to customers. Thigh bandwidth utilization allows adding more customers to the network. Thus, a queue manager in an ONU is an enabler for any DBA algorithm executed by the OLT.

One of the key causes for low bandwidth utilization is the packet fragmentation loss. A fragmentation loss occurs when a grant does not match precisely the amount of bytes to be transmitted by the ONU. An ONU is not allowed to fragment packets, causing the remaining portion of a grant to be wasted. FIG. 1 shows a grant with a grant length 102. If for example three packets, marked #1, #2, and #3, are to be included in the grant, packets #1 and #2 will fit, while packet #3 will not. There will be a fragmentation loss 104 given by the grant length minus the sum (in bytes) of the packets transmitted.

FIG. 2 shows a prior art EPON system comprising an OLT 200 and a plurality of ONUs 202. The OLT and the ONU-s exchange messages. In each cycle of such an exchange, the OLT grants a grant G to each ONU, which is answered by a report message REP from the ONU to the OLT. For example, the reporting by the ONU to a grant received in a cycle N−1 at a grant message time $t_G(N-1)$ occurs at a report message transmission time $t_R(N-1)$. Regardless of the particular algorithm be used to differentiate between ONUS, the basic granting scheme is identical. An ONU must have a deterministic behavior in the time period between report message transmission and grant message reception, i.e. $t_G(N-1)-t_R(N-1)$. The information of the OLT is updated only up to $t_R(N-1)$. The transmission order depends on packet priority, which can be any arbitrary value (e.g. 0.7 in EPON). In this case, 0.7 means that there are 8 priorities, numbered from 0 to 7, with 0 being the lowest and 7 being the highest. Whenever a packet of a higher priority exists in the queue, it will be transmitted before any packet of a lower priority.

The ONU reports the total number of bytes ("total bytes") existing in any of the sub-queues. The IEEE802.3 standard allows reporting additional information per sub-queue, the additional information based on defining a programmable threshold per sub-queue. The threshold is set by the OLT using a proprietary message. For examples in a sub-queue with 5 packages of priority 0.5, the threshold in bytes may be 1600, 4000, 3000, 3000, 4000 and 2000, respectively. The ONU reports the total number of bytes below the programmable threshold. In the example above, this number could be 1500, 0, 2800, 0, 3900 and 1500, and it is a result of the actual queue occupancy. Utilizing this information will help to reduce the grant size, which can be used for finer granting.

FIG. 3 shows a flow chart of the steps in the reception of a packet to a queue by the ONU, as occurring in prior art systems. The packet is written in step 300, and the priority of the packet is extracted in step 302. The length of the new packet is added to the content ("total bytes") of the appropriate (same priority) packet sub-queue in step 304, to yield a new "total bytes" value. If the combined value of "bytes below threshold" and packet length is still smaller than the threshold of the sub-queue, the value of the "bytes below threshold" of the particular sub-queue is incremented with the packet length in step 306. Else, the value of the "bytes below threshold" remains unchanged. For example, a packet with a length of X bytes is added to the relevant sub-queue that has a threshold T and a value of "bytes below threshold" M. If X+M<T, M=M+X. Else, M remains unchanged.

The methods used in prior art result in packet fragmentation losses and therefore low bandwidth utilization. It is thus desirable to provide a new set of efficient management methods and algorithms that will eliminate packet fragmentation losses, enable efficient full bandwidth utilization and guarantee QoS.

SUMMARY OF THE INVENTION

The present invention discloses various embodiments of dynamic bandwidth allocation methods and algorithms, designed to avoid fragmentation loss. Their main innovative aspect is guaranteeing that a length of a grant issued by an OLT will match precisely the count of bytes to be transmitted by an ONU. The present invention provides, in various embodiments, methods for determining an ONU uplink transmission egress order (also referred to as "ONU egress order"), and of an ONU report threshold setting (also referred to as "threshold setting"). Existing queue management algorithms such as "Strict priority", "Fair queuing" and their derivations, are not suitable for distributed switch management, as they do not consider EPON protocol events, such as the time a "Report" message was transmitted. In contrast, the queue management methods and algorithms disclosed herein takes into consideration EPON protocol events, such as queue occupancy at a "Report" message preparation time; and at a "Grant" message handling time.

According to the present invention, there is provided in a passive optical network a method for transmitting packets by an ONU comprising the steps of receiving a grant having a grant length from an OLT, and based on the grant, calculating an ONU packet egress order that eliminates packet fragmentation.

According to the present invention, there is provided in a passive optical network a method for eliminating packet fragmentation comprising the steps of providing an OLT connected to a plurality of ONUs, each of the ONUs transmitting packets arranged in sub-queues having a total byte length, the packets transmitted in response to a grant having a grant length and received from the OLT, and matching the total byte length with the grant length, whereby the fragmentation loss is eliminated.

According to the present invention, there is provided a method for setting a threshold for dynamic bandwidth allocation in a passive optical network that includes an OLT and a plurality of ONUs, the method comprising the steps of providing a weighted fair queuing configuration to the OLT, and providing a threshold used in combination with the weighted fair queuing configuration while granting a grant with a desired grant length to an ONU.

According to the present invention, there is provided a method for setting a threshold in a passive optical network that includes an OLT and a plurality of ONUs, the OLT granting grants to the ONUs, which in turn transmit packages arranged in sub-queues in response to the grants, the method comprising the steps of performing a comparison between ONU-reported parameters and a desired grant length, and adjusting a threshold based on the results of the comparison, thereby providing a target bandwidth adaptation mechanism in which the threshold value of all sub-queues is identical.

According to the present invention, there is provided a method for setting a threshold in a passive optical network that includes an OLT and a plurality of ONUs, the OLT granting periodically a grant having a grant length to each ONU, the ONU transmitting packages arranged in sub-queues in response to the grant, the method comprising the steps of providing a plurality of priorities, each associated with a sub-queue of packages, each priority having a unique priority threshold, and adjusting each priority threshold such that a sum of all the adjusted priority thresholds has a fixed value.

BRIEF DESCRIPTION OF THE DRAWINGS

The invention is herein described, by way of example only, with reference to the accompanying drawings, wherein:

FIG. 8 shows an implementation of WFQ using threshold setting according to the present invention;

DESCRIPTION OF THE PREFERRED EMBODIMENTS

The present invention provides, in various embodiments, methods for determining an ONU egress order, and of an GNU threshold setting. These embodiments are now described in detail below.

ONU Egress Order

Figure 1:
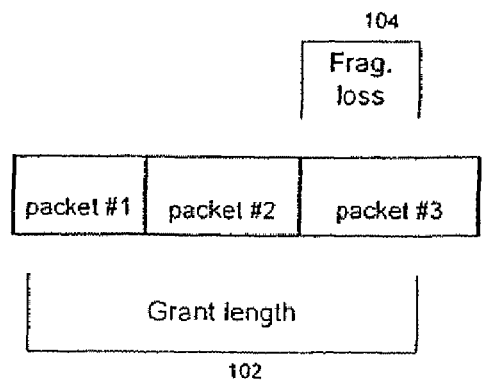
FIG. 1 shows schematically an example of fragmentation loss.
Figure 2:
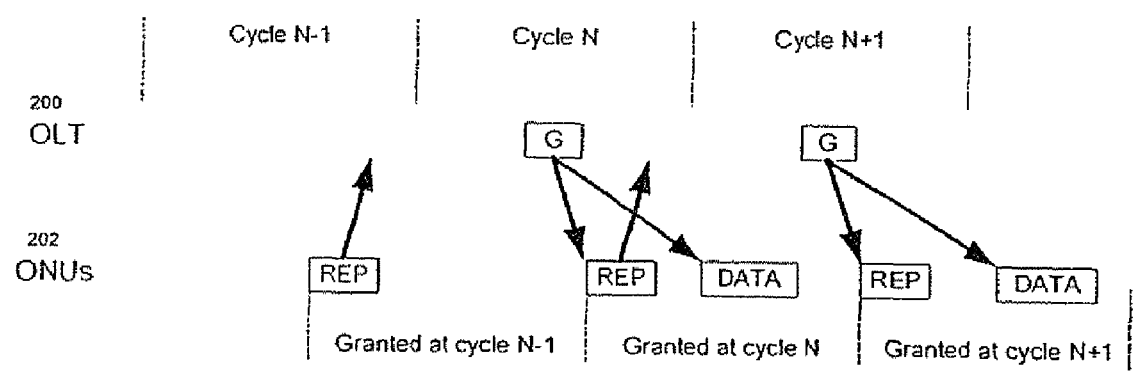
FIG. 2 shows schematically a prior art method for controlling messages flow between an OLT and an ONU.
Figure 3:
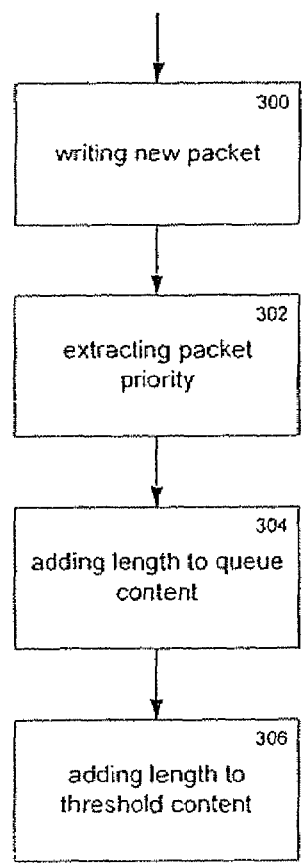
FIG. 3 is a flow chart of packet reception by an ONU.

The key feature for avoiding fragmentation loss is the OLT's ability to control the transmission order of packets transmitted by an ONU. The system and algorithm of FIG. 2 do not avoid fragmentation loss because they use a single test of a stage variable, as opposed to a three-test procedure in the method of the present invention described below. Any update in the status of a queue (i.e. the list of packets with their lengths and their transmission order, which is a function of priority) at a specific time must be hidden from the OLT. According to the present invention, in order to hide the packet transmission events, an ONU performs a pre-calculation of packet transmission order for an upcoming grant. When the grant message arrives, the ONU calculates the order of packets supposed to be transmitted, and marks these packets as "about to be transmitted". If more grants arrive, the ONU will ignore the marked packets as if they were already transmitted, although, in practice, those packets are still in a transmission queue, waiting for their upcoming transmission. The transmission queue comprises sub-queues, each including packets of the same priority.

In order to hide packet reception events, an ONU must freeze (i.e. lock the transmission order of) its queues. A packet received from a user port will not be transmitted, unless the ONU pre-calculation marks the packet as "about to be transmitted" in the start time specified in the grant message.

Figure 4:
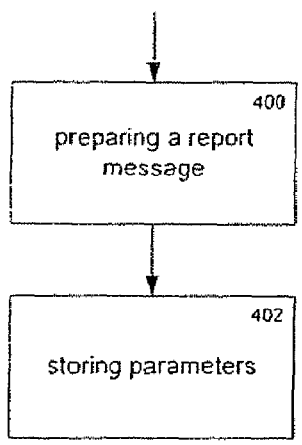
FIG. 4 shows a flow chart of the steps in the report preparation and storage by an ONU.

FIG. 4 shows a flow chart of the steps in the report preparation and storage by an GNU. In a report preparation step 400, the current values of "total bytes" and of "bytes below threshold" of each sub-queue are embedded inside the report message. These parameters are stored in step 402 in two storage array variables: a stored array value of "total bytes", and a stored array value of "bytes below threshold", both being used in the method for determining the ONU transmission egress order below.

Figure 5:
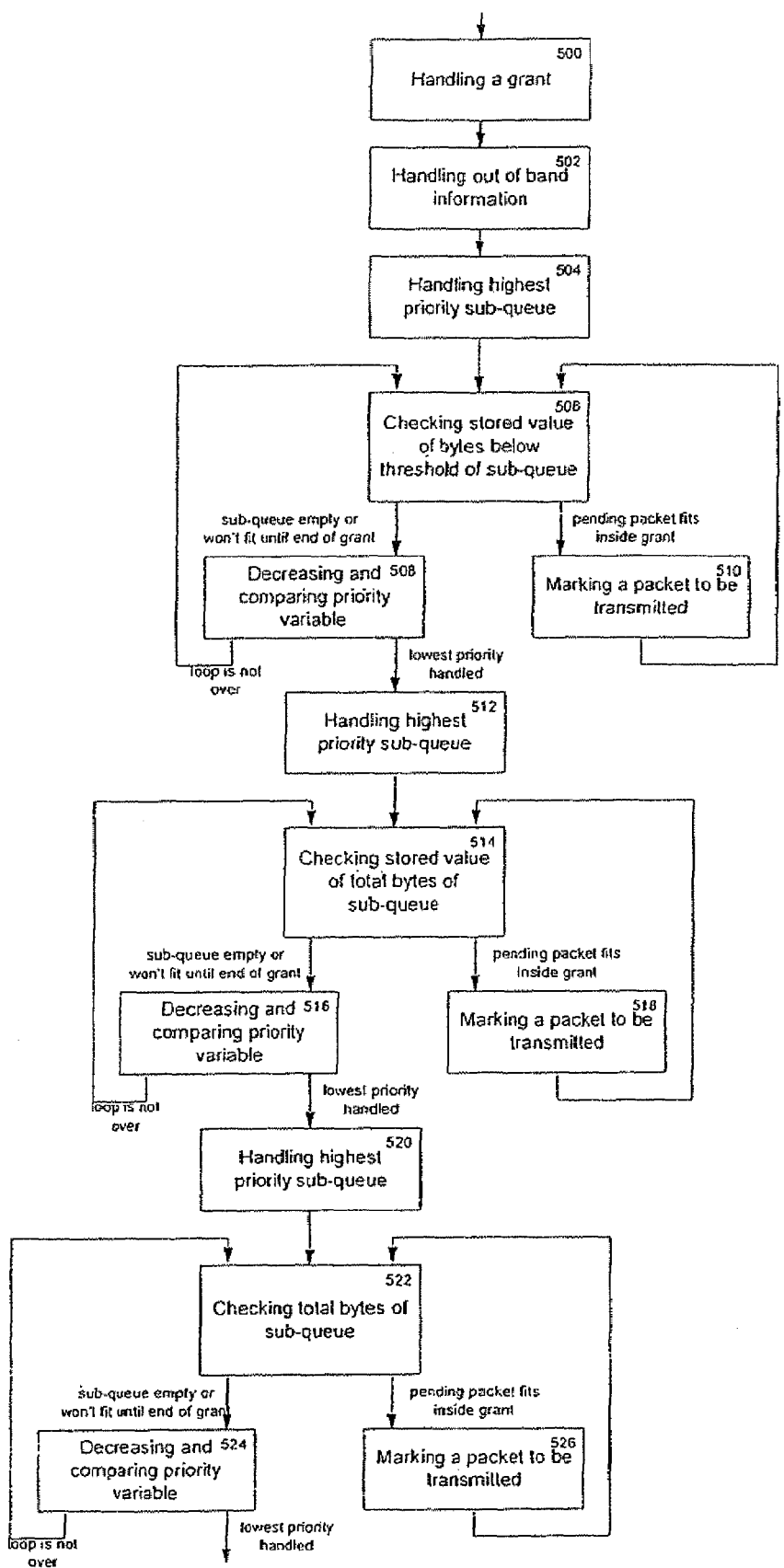
FIG. 5 shows a preferred embodiment of the method for determining an ONU uplink transmission egress order according to the present invention.

FIG. 5 shows in a flow chart a preferred embodiment of the method for determining an ONU uplink transmission egress order according to the present invention. The description refers to one cycle in a series of cycles that represent continuous operation of grants. Each cycle sees a grant being granted by the OLT. A new grant sent by the OLT is handled by the ONU in step 500. A "remaining grant length" (i.e. a variable storing the available space (in bytes) left in a grant to be filled) is loaded with the grant length value arriving with the grant in the present cycle. Any messages handled via special queues, such as report messages in a Multi-Point Control Protocol (MPCP), are first decreased from the remaining grant length in step 502. The method includes a number of actions run in preferably three "stages", each such stage involving a series of actions performed on a "stage variable". The three stage variables, each tested or "acted upon" in each cycle are (preferably in this order): "reported bytes below threshold", "reported total bytes", and "total bytes". Each stage variable is treated separately, starting with a stage that treats "reported bytes below threshold", which undergoes processing according to steps 504 to (potentially) 518, the second stage repeating the process with "reported total bytes", and the third stage repeating the process with "total bytes".

In the first stage, the stage variable value is initialized to "reported bytes below threshold" in step 504. The highest priority sub-queue starts to be handled in step 506. "Handling" in this context indicates acting upon or treating only this sub-queue. In step 508, the sub-queue is checked to see if it includes ungranted packets, i.e. if there is at least one packet that has not been granted yet, and which can be potentially transmitted. If there is no such packet, the execution continues from step 518. If there is such a packet, its length is compared with the remaining grant length in step 510. If the ungranted packet fits inside the grant (i.e. the grant length is bigger than the ungranted packet length) a "stage condition" (explained below) is checked in step 512. If the ungranted packet does not fit inside the grant, execution continues in step 518. The type of check run for the stage condition in step 512 depends on the chosen stage variable. If the stage variable used is "reported bytes below threshold", its value is compared to 0. Similarly, if the stage variable used is "reported total bytes", its value is compared with 0, and if the stave variable used is "total bytes", its value is compared with 0. In other words, the execution moves to, and continues from, step 518 in each of the following cases: the result of the comparison in step 512 is 0, a failure occurs in step 610 (i.e. an ungranted packet has a length too long for the grant), or a failure occurs in step 508 (i.e. there are no ungranted packets in sub-queue). If the stage condition checked in step 512 succeeds, meaning the value of the compared stage variable is greater than 0, execution continues from step 514. In this step, the packet is marked as "granted", (i.e. is no longer considered as ungranted). In the following step 516, the "granted" packet length is subtracted from all variables, namely from the remaining grant length, from "reported bytes below threshold", from "reported total bytes", from "reported bytes below threshold", and from "total bytes". However, if the value of one these variables is 0, the "granted" packet length is not subtracted from it. The execution then returns to step 508, where the sub-queue is investigated again, for a next packet.

If any of the comparison checks in steps 508, 510 or 512 results in the execution being sent to step 518, in step 513, the priority of the presently handled queue is compared with the lowest priority. If the priority of the presently handled sub-queue is not the lowest priority, then in step 520 the priority of the presently handled sub-queue is decreased by 1, to enable handling of the next priority sub-queue. The execution returns to step 508, where the new sub-queue starts to undergo the same sequence of steps as above. If the priority of the presently handled sub-queue in step 518 is the lowest, execution continues from step 522. In step 522, the stage variable is checked to see if it is set to "total bytes". If yes (stage variable is "total bytes") the operation is completed, and the execution returns to step 500, to wait for the next grant. If no (stage variable is set to one of the other two possibilities), the execution continues to step 524, in which the stage variable is updated. That is, if the just processed stage variable was "reported bytes under threshold", the variable is now, updated (set) to be "reported total bytes", and if it was "reported total bytes" it is set to "total bytes". The execution continues from step 506, where other sub-queues start to be examined again from highest to lowest priority.

In summary, the method includes running, for each sub-queue, a series of tests in preferably three stages. Each stage includes a check of a stage variable value against a set value (zero). Based on the result of the check, a previously ungranted packet is either "marked as granted" and shunted aside, or left in the sub-queue, the process being replayed with the next highest priority sub-queue. In contrast with prior art methods that employ only one (instead of three) tests, the method embodied by the flow chart in FIG. 5 guarantees a perfect match (eliminates packet fragmentation) between the OLT granting decision, which is based on its latest knowledge, and the ONU egress order. It allows a flexible OLT grant length selection, which can be any combination of values of "bytes below threshold" and "total bytes" values. The single constraint is that these values most be accumulated from highest to lowest priority, and that all "bytes below threshold" must be accumulated before adding "total bytes" to grant length. Prior art methods include the equivalent of only one stage (and test) of the present method, that of "total bytes". In other words, prior art methods run only one of the three "stages" disclosed herein, thus being much less efficient in eliminating packet fragmentation. Dividing the operation into such "stages" allows the OLT to have flexibility in calculating the grant length, as described above. The major inventive feature of the method appears in step 514, in which packets are "marked" as "granted", even though they are still in the sub-queue, while additional calculations are then performed as if these "marked as granted" packets were transmitted. Step 522 is the one responsible for the decision to continue to the next cycle.

Figure 6:
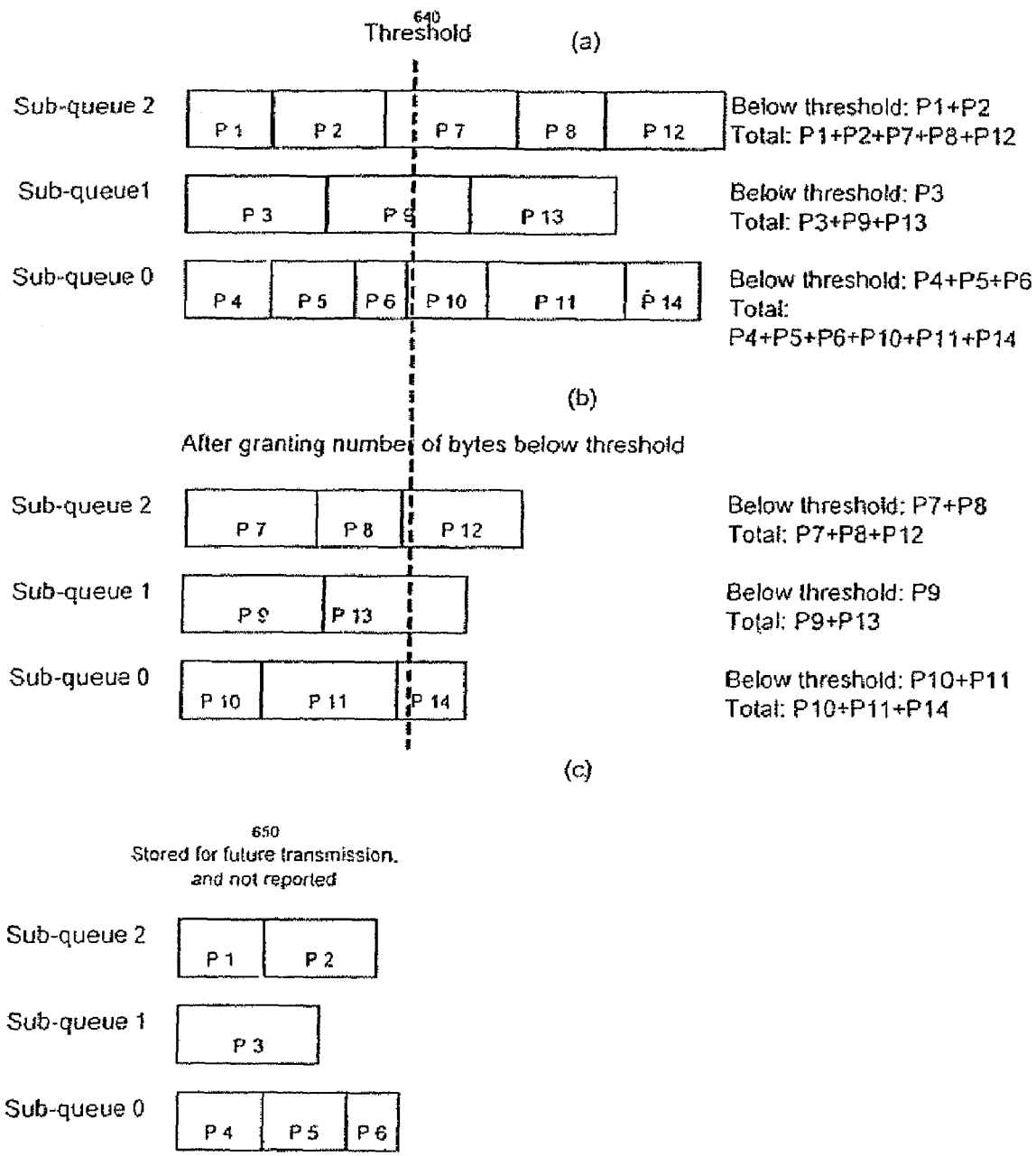
FIG. 6 is an example of a queue egress process.

FIG. 6 shows an example of a queue egress process according to the present invention, in the case in which the OLT grant length precisely matches the sum of packets length below threshold for all sub-queues. In (a), packets P1-P14 display an initial queue occupancy: P1 indicates a first packet transmitted, P2 indicates a second packet transmitted, and so on. For simplicity, only 3 sub-queues marked "0", "1" and "2" are displayed, and all thresholds of the sub-queues are identical, and marked as Threshold 640. The OLT transmits a grant that has a length equal to the sum of the reported bytes below threshold, i.e. (P1+P2)+P3+(P4+P5+P6). The grant is sufficient to include all the packets below the threshold. These packets are stored in a separated storage 650, shown it the bottom in (c). They are the next packets to be transmitted, and will not be included in future reports. Packets P7-P14 in FIG. 6(*b*) are the only packets considered in the current queue status, and the only packets that will be reported. The queue status is updated as if packets P1 to P6 were transmitted. It is clear that it is not necessary to physically copy the packet(s) to separate storage 650, as one could use pointer management manipulations for that purpose.

Figure 7:
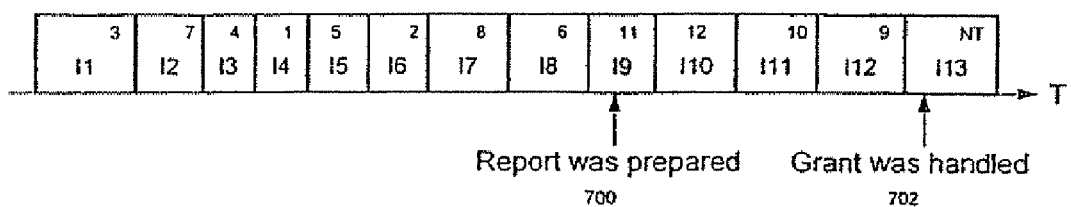
FIG. 7 is a diagram showing the timing relation between queue ingress and egress processes.
Figure 7:
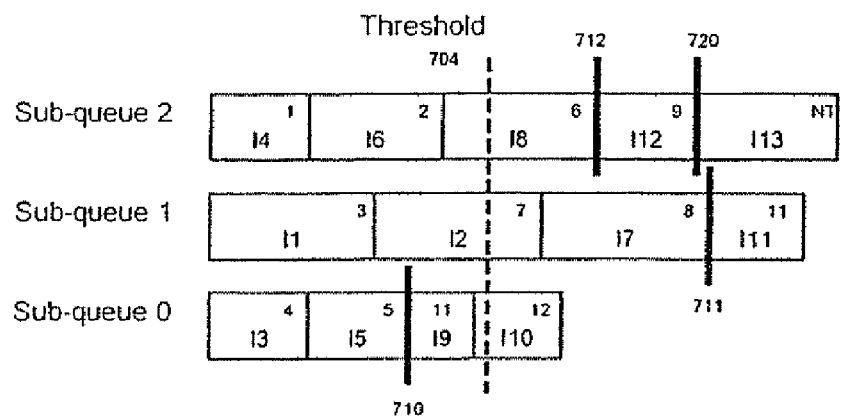

FIG. 7 shows an example of the timing relation between a queue egress process and an ingress process, as occurring using the method described herein. The top (a) section shows a queue ingress timeline T with items (packets) marked I1-I13 from left to right. The bottom (b) section shows packets arranged by priority in three sub-queues "0", "1" and "2". Inside each item, there are two numbers: a bottom one starting with I and marking the ingress order, and a top one marking the egress order. Box I9 marks the event of packet reception. There are two major events on the ingress timeline: the first, item 700 (which coincides with the packet reception in box I9) is the preparation of a report message, which is done just before the next transmission requiring report. The second event, item 702, is the reception of a grant by an GNU. Packets I1-I8 were received before the report was prepared in item 700, and packets I9-I12 were received before the grant was handled in item 702. Item 710 marks the packets existing in sub-queue #0 when the report was prepared, while items 711 and 712 mark the same for stub-queues #1 and #2 respectively. Item 720 marks the packets existing in sub-queue #0 when the grant was received.

As can be seen, a higher priority packet will be selected for transmission before a lower priority packet even if the lower priority packet arrived earlier. For example, the third packet received, i.e. item I3, will be transmitted after the fourth packet received, i.e. item I4. In another example, I1, the first packet received, will be transmitted after I6, the sixth packet received. Item I9, which identifies the ninth packet received, is still below threshold (i.e. it has priority over packets above threshold) but since it was received after the report was prepared, it will be transmitted after the twelfth packet received (item I12), because the information by the algorithm is the status of packets below threshold at the report preparation moment. Item I13, which identifies the thirteenth packet received will not be transmitted at all in the next grant, as it was received after the grant was handled.

Threshold Setting

In the dynamic bandwidth allocation methods and algorithms of the present invention, the values of the thresholds greatly affect the order in which packets will be granted, the balance between different priorities, and the possible Granularity for grant length selection. The last item is a result of an OLT decision, which, in order to avoid fragmentation error, may take for grant length calculation either the value of "bytes below threshold" or of "total bytes". As the span between these two values is potentially large, setting the threshold correctly is important when targeting an allowed bandwidth for a user. The present invention discloses three different embodiments of threshold setting methods.

In a first embodiment of a threshold setting method according to the present invention there is provided a mechanism that adjusts dynamically the thresholds, using an improvement on a prior art mechanism. This mechanism is called Weighted Fair Queuing (WFQ) and is adapted herein to a distributed switching architecture, as the GNU is remotely controlled by the OLT. The "adaptation" includes enhancing the WFQ algorithm by introducing a threshold concept inside it. The WFQ method and its derivatives are based on ordering the traffic in classes ("classification"). The classification process is well known in the art. Each class receives a constant share of the bandwidth. For example, class 1 has 40%, class 2 has 30%, class 3 has 10%, and class 4 has 20% of the bandwidth. This guarantees deterministic and fair bandwidth control. In order to support WFQ, an ONU must support classification. Flows based on packet parameters are directed to specific classes.

FIG. 8 shows an implementation of WFQ using threshold setting according to the present invention. The implementation is described as a flow diagram, and effected using a state machine. For support of multiple ONUs, the OLT should create multiple instances of this state machine, one per each ONU. FIG. 5a shows the operating environment. In step 300, the OLT receives a report message from an ONU. In step 802, the OLT sets a grant length to the value of the sum of "bytes below threshold" as reported by all queues. In step 804, the OLT transmits the grant message toward the ONU.

FIG. 8b shows the innovative adaptation of WFQ with thresholds according to the present invention (i.e. the way the OLT determines the threshold for transmission). In step 850, the OLT receives a WFQ configuration, in the form of the ratios of each sub-queue priority. Packets from a certain class are stored inside a specific sub-queue, i.e. a class ratio is the sub-queue ratio. The desired grant length is received as well from a management system, responsible for subscriber agreements (not shown). In step 852, variables for each sub-queue, storing the number of bytes metered (counted) during ONU transmissions, are initialized to 0. In step 854, the OLT calculates the threshold for each sub-queue, using preferably the following scheme: the desired grant length is multiplied by the sub-queue (class) ratio and further multiplied by a calibration factor, typically equal to 1.25, and the product is sent as a threshold to the sub-queue. For example, if the desired grant length is 8000 bytes, if the class ratios are 0.3, 0.4, 0.2, 0.1, and if the calibration factor is 1.25, the thresholds are respectively 3000 (8000×0.3×1.25), 4000, 2000, and 1000. Evidently, the constant shown here are exemplary only, and other constants can be selected. The OLT then transmits a message containing the thresholds of all sub-queues to the ONU in step 856.

The following steps are optional, and are required only if an adaptive mechanism is desired. In step 858, the OLT counts the number of bytes transmitted from each sub-queue. In step 860, the OLT adds the counted value to the value stored in a total counted variable. In step 862, the OLT checks if the ratios between the counted values of the sub-queues and expected values (calculated by summing all the counted bytes of all sub-queues, and then multiplying the sum with the configured ratio per sub-class) differ significantly, for example by a 10% relative difference or a 5% absolute difference. These differences may result from a variance in packet length between sub-queues. If no difference is found, the OLT returns to monitor the number of bytes transmitted in step 858. If a difference is found, the OLT adjusts the thresholds in step 864. The adjustment can be done in many ways, for example by increasing the threshold for the deprived sub-queues (meaning those queues whose percentage of transmitted bytes relative to the sum of transmitted bytes of all sub-queues is less than configured), and by decreasing the threshold for the advantaged sub-queues (meaning those queues whose percentage of transmitted bytes relative to total transmitted bytes is more than configured). After adjustment, the OLT returns to step 856 to transmit the message.

The key step is 854, in which the threshold per sub-queue is calculated based on WFQ ratios. In contrast with standard WFQ algorithms, which base the packet selection on mechanisms that measure transmitted rate, in the improved WFQ method of the present invention includes two innovative features: a packet selection based on setting a threshold, which defines a rule for status report, and the use of the ONU property to transmit first the all packets below threshold, which allows easy maintenance of the ratio between priorities, without optional periodic adjustments.

In a second embodiment of a threshold setting method according to the present invention, there is provided a mechanism that adjusts dynamically the thresholds to predict the reported bytes below threshold. This mechanism is named Target Bandwidth Adaptation (TABA). The coal is to match a grant length as closely as possible to a desired length. The mechanism sets all threshold values of all sub-queues to be identical. That is, all priorities have the same threshold. The main concept is to increase the threshold values when the sum of reported bytes below threshold of all priorities is too low, and to decrease the threshold values when the sum of reported bytes below threshold of high priority queues is too high. The concept is illustrated in FIG. 9

Figure 9:
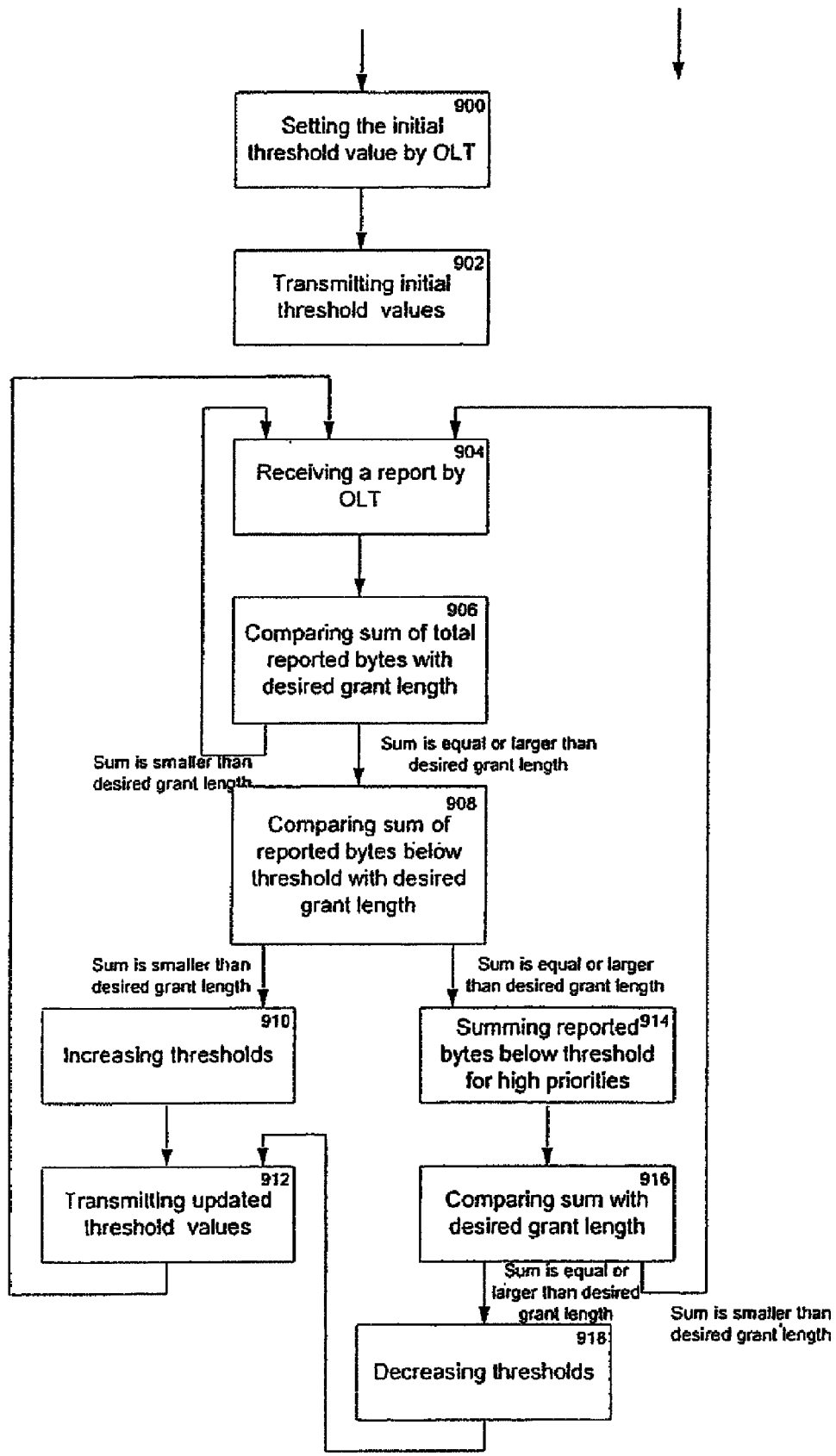
FIG. 9 shows a flow chart of the steps of a threshold setting method using the TABA mechanism according to the present invention.

FIG. 9 shows a flow chart of the steps of a threshold setting method using the TABA mechanism. The flow chart shows the handling of one ONU by an OLT related state machine. As with the WFQ embodiment of FIG. 8, for support of multiple ONUs, the OLT should create multiple instances of this state machine, one per each ONU. In step 900, the OLT sets an initial value of a threshold (which is identical for all sub-queues), typically to (1.5/number of priorities)*desired grant length. The number of priorities is the number of sub-queues in a queue and the number of packet classes. In step 902, the OLT transmits the threshold value toward the specific ONU. In step 904, the OLT receives a report from the specific ONU. In step 906, the OLT compares the sum of the values of "total bytes" reported in step 904 to the desired grant length. If the sum is smaller than the desired grant length, the operation returns to step 904, as no adjustment can be done to the threshold, since the ONU does not have enough data to adjust according to. In other words, the ONU traffic is too low, and not enough to fill the desired grant length, regardless of any effort made to adjust the threshold. If the sum is equal or larger than the desired length, operation continues from step 908. In this step, the OLT compares the sum the values of reported bytes below threshold with the desired grant lengths. If the sum is larger than the desired length, the operation continues from step 914. If the sum is smaller than the desired length, the operation continues from step 910. In step 910, the thresholds (all equal to one value) are increased by an arbitrary function, for example by multiplication with a constant or by addition of a constant. The execution then goes to step 912, in which a new message that updates the threshold value is transmitted, and the execution returns to step 904. In step 914, the OLT sums the values of reported bytes below threshold from the highest priority to a configurable priority to obtain a "high-priority" sum. Typically, the configurable priority will be 50% of the highest priority, rounded up. The high priority sum is then compared with the desired grant length in step 916. If the high priority sum is smaller than the desired length, the execution returns to step 904. Otherwise, execution continues from step 918, where the thresholds are decreased by an arbitrary function, for example by division with a constant or by subtraction of a constant, following which the execution goes to step 912.

The key steps are 908 and 916 that compare the desired grant length with information arriving in a report message. The comparisons allow the adaptation of the threshold to predict the grant to be as close as possible to a desired value.

For example, assume that the desired grant length is 10000, and the number of priorities is 4. The initial threshold value is (1.5/4)*10000=3750. For simplicity, assume that the reported number of "total bytes" and bytes below threshold of all priorities is identical. Assume that in the first cycle, the reported value of "total bytes" is 2000 per priority. As this value is smaller than the threshold, it will be reported as the amount of "bytes below threshold". Since the sum of the "total bytes" is 8000, i.e. smaller than the desired grant length of 10000 (as checked in step 906), no adjustment is done. Assume that in the second cycle, the reported value for "total bytes" is 5000. The bytes below threshold reported value is 2000 (since it must be smaller than the threshold which is 3750), As the sum of bytes below threshold is smaller than the desired grant length (10000), the threshold should be increased. In this example, the threshold is increased by 20% to 4500, and a threshold update command is transmitted to this ONU. Assume that in the third cycle, the reported value of "total bytes" is again 5000, and the reported value of bytes below threshold is 3000. The sum of bytes below threshold is now 12000, hence the threshold should not be increased. The sum of "bytes below threshold" of the highest priorities (which was assumed here to be the group of the two highest priorities), i.e. the "high-priority" sum defined above is 6000, hence the threshold should also not be decreased. In other words, after the third cycle, the threshold is left unchanged, and the cycles end.

In a third embodiment of a threshold setting method according to the present invention there is provided yet another mechanism that adjusts dynamically the thresholds to predict as close as possible the traffic partition between priorities. This mechanism is named Priority Traffic Monitor (PTM). As opposed to the previous (TABA) methods each priority has in this case a unique threshold value, based on the amount of data arriving from the priority. The main concept is to set the sum of all thresholds to a fixed value, typically larger than the length of a desired grant. The threshold values are adjusted based on actual "bytes below threshold" reported per sub-queue associated with a priority.

Figure 10:
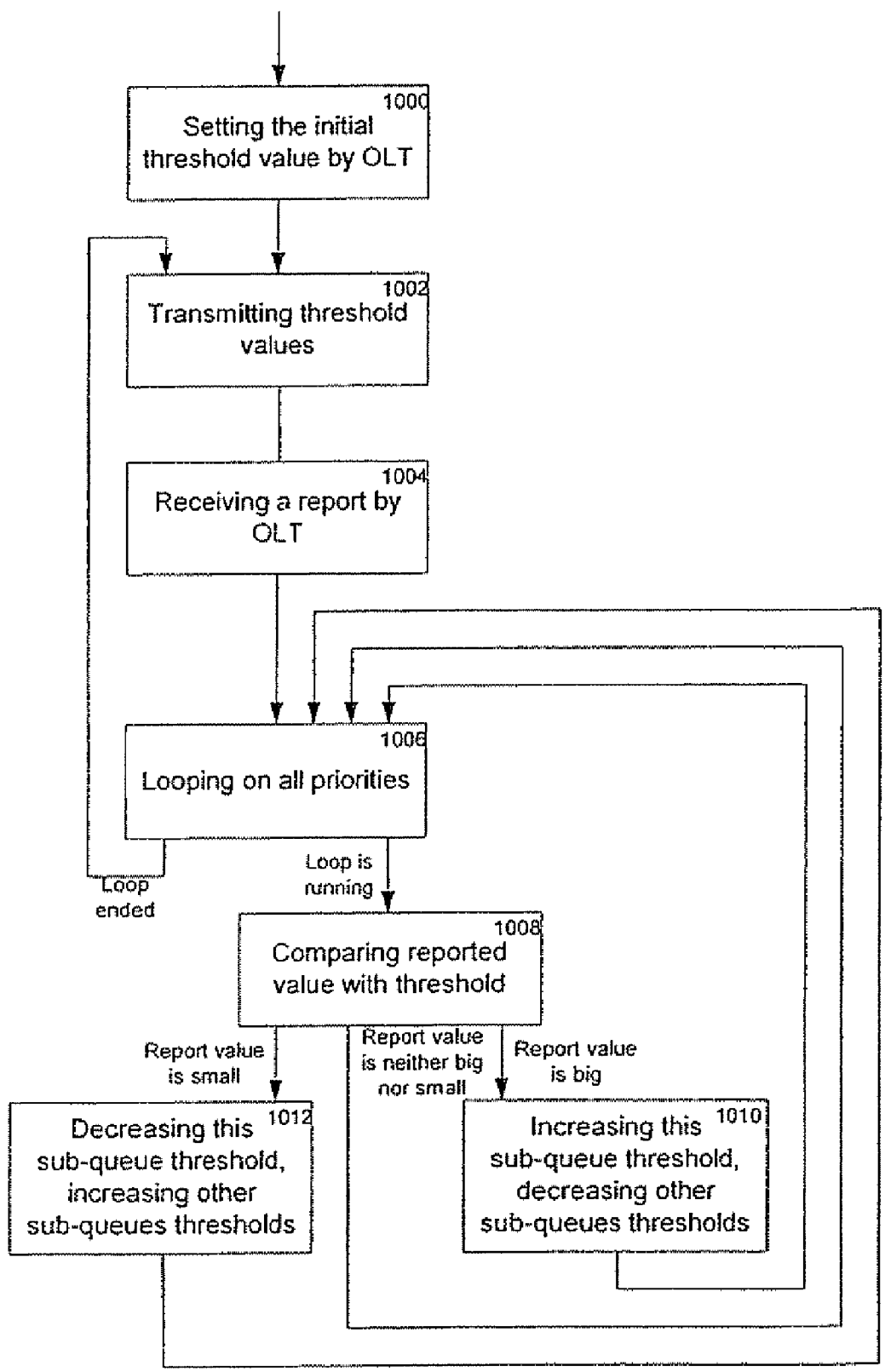
FIG. 10 shows a flow chart of the steps of a threshold setting method using the PTM mechanism, according to the present invention.

FIG. 10 shows a flow chart of the steps of a threshold setting method using the PTM mechanism. The flow chart shows handling of one ONU by an OLT related state machine. As in the two previous (WFQ and TABA) methods, the PTM method may be used with a plurality of ONUs, by providing multiple instances of the state machine. Steps 1000-1004 are essentially similar to steps 900-904 in FIG. 9. In step 1000, the OLT sets the initial value of each threshold, typically to (1.5/number of priorities*desired grant length). In step 1002, the OLT transmits the threshold value toward the specific ONU. In step 1004, the OLT waits until a report message is received from the specific ONU. In step 1006, a loop defined by a loop index is run over all priorities. When the loop ends, the execution returns to step 1002. As long as the loop runs, step 1008 is comparing the reported value of bytes below threshold for the current sub-queue associated with a priority loop variable with the expected threshold for the same sub-queue. That is, the loop index marks the presently examined sub-queue. If the value of reported bytes below threshold is too big, meaning the reported value is larger than a predefined portion of the threshold, for example ⅔, the execution goes to step 1010 in which the threshold of the sub-queue associated with the loop variable priority is increased by a constant value, while the other thresholds of the other sub-queues are decreased by the same constant divided by (number of priorities−1). For example, if the reported value of bytes below threshold is 5000 and the expected threshold is 6000, then the threshold for this priority will be incremented, based on the ⅔ ratio for this example. Assuming there are 4 priorities, and the value added is 600, then following this step the threshold for this priority will be 6600, while all the other thresholds of all other priorities will be subtracted by 200. Afterwards, the execution returns to the loop to step 1006. If the value is too small, meaning, the reported value is smaller than a predefined portion of the threshold, for example ⅓, the execution goes to step 1012 in which the threshold of the sub-queue associated with the loop variable priority is decreased by a constant value, while the other thresholds of the other sub-queues are increased by the same constant divided by (number of priorities−1). Afterwards, the execution returns to the loop to step 1006. If the value is neither too big nor too small, meaning it is located between the high and low thresholds, no adjustment is required, and the execution returns to the loop in step 1006. Steps 1010 and 1012 are aimed at maintaining the sum of all thresholds constant.

The key step is 1008, which enables investigation of each sub-queue in terms of reported values vs. threshold values, to determine how to adjust the threshold, which is either increased, decreased, or left unchanged.

For example, assume that the desired grant length is 10000, the number of priorities is 4, and the update constant is 450. The initial threshold value is (1.5/4)*10000=3750. Assume that in the first cycle the reported "bytes below threshold" is 3000 for all priorities. The loop begins running on each priority. For each given priority, the value of the threshold should be increased, while other priority thresholds should be decreased. For example, the value of the first priority threshold is increased by 450, and that of all other priority thresholds are decreased by 450/3. After the first loop execution the thresholds will accordingly be 4200, 3600, 3600 and 3600. After the second execution the thresholds will be 4050, 4050, 3450, 3450. After the third execution the values will be 3900, 3900, 3900, 3300, and at the end the values will be 3750 for all priorities. As seen, the original values of all thresholds are still valid, since all the reported "bytes below threshold" were equal. Assume that in the second cycle, the reported bytes below threshold were 3000, 2000, 2000 and 1000 respectively. After the first loop execution, the threshold values will be (as in the first loop of the first cycle) 4200, 3600, 3600 and 3600. The second and third execution will not modify the values, since the value of "bytes below threshold" is bigger than the condition to decrease (⅓ of threshold), and smaller than the condition to increase (⅔ of threshold). In the last execution, the value of "bytes below threshold" is smaller than ⅓ of the threshold, requiring a decrease in the threshold value for this priority, and an increase in the threshold value of other priorities. After the last execution, the threshold values will be 4350, 3750, 3750, 3150.

Figure 11:
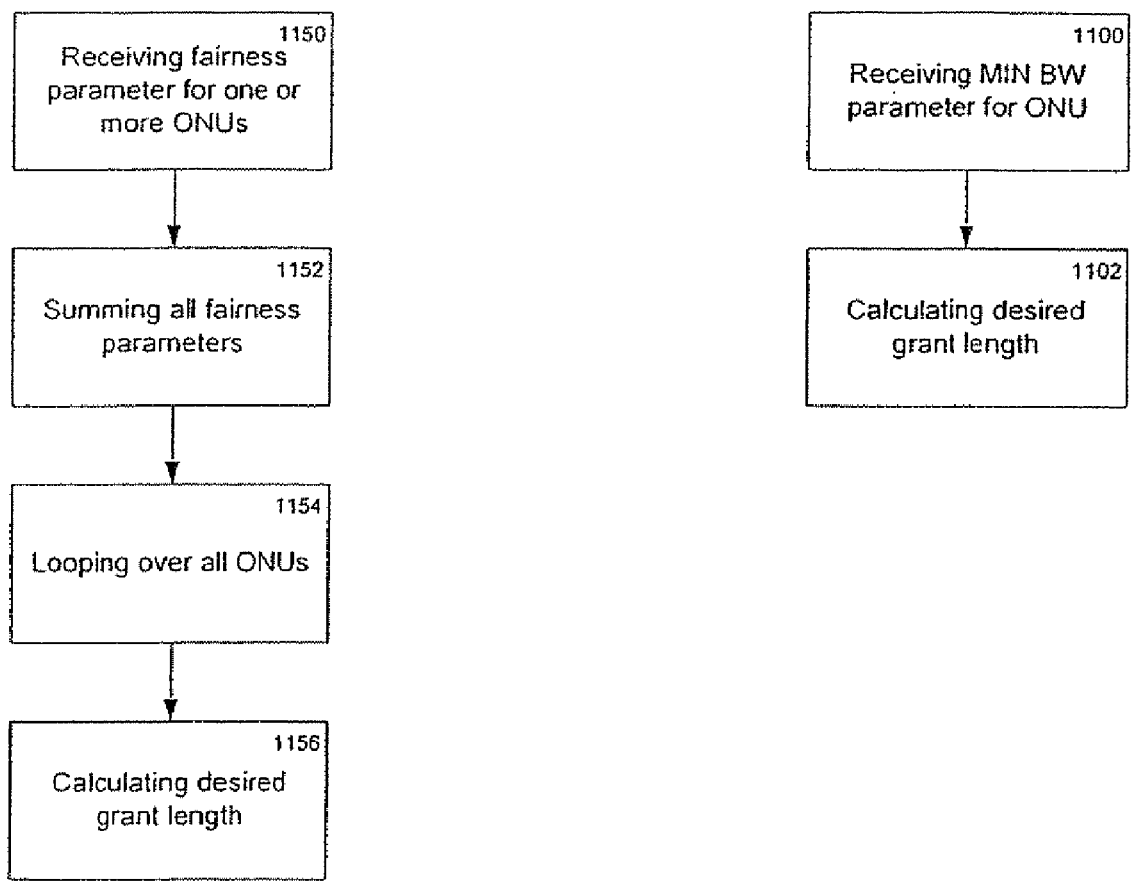
FIG. 11 is a flow chart of a desired grant length calculation.

For the sake of completeness, FIG. 11 presents two examples for determining the desired grant length. The right side mechanism (steps 1100-1102) is based on adjusting the desired grant length to minimum bandwidth, and the left side mechanism (steps 1150-1156) is based on adjusting the sum of all ONU desired grant lengths to cycle length. That is, we take all desired grant lengths of all ONUs, sum them, and adjust them to cycle length. A "cycle length" is the number of bytes granted at a single OLT granting decision, covering all ONUs.

Beginning with the right side mechanism, in step 1100, a new or updated minimum bandwidth (MIN BW) requirement arrives from a management system responsible for customers Service Agreement Level for one of the ONUs. In step 1102, the MIN BW value is used to calculate the desired grant length, which should be equal to (MIN BW/available BW)*cycle length.

The left side mechanism begins in step 1150, in which the OLT receives a new or updated "fairness parameter" requirement for one or more ONUs. There are many possible representations of a fairness parameter. For example, bandwidth may be divided linearly between ONUs based on the fairness parameter. In step 1152, the sum of all fairness parameters (one per ONU) is calculated. In step 1154, a loop is executed, running over all ONUs. In step 1156, the desired grant length is calculated for the loop index (step 1156 is executed for each loop cycle) by, preferably using the formula: grant length= (ONU fairness parameter/sum of fairness parameters)*cycle length All publications and patents mentioned in this specification are herein incorporated in their entirety by reference into the specification, to the same extent as if each individual publication or patent was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made. What has been described above is merely illustrative of the application of the principles of the present invention. Those skilled in the art can implement other arrangements and methods without departing from the spirit and scope of the present invention.

What is claimed is:

1. A method for setting a threshold for dynamic bandwidth allocation in a passive optical network that includes an optical line terminal (OLT) and a plurality of optical network units (ONUs), the method comprising the steps of:
   a. providing a weighted fair queuing configuration to the OLT; and
   b. by the OLT, granting a grant with a desired grant length while providing to an ONU a threshold, based on said weighted fair queuing configuration, that depends on the desired grant length;
   wherein the threshold is for distinguishing packets to be sent from the ONU to the OLT in response to the grant from packets to be retained in the ONU in response to the grant.

2. The method of claim 1, wherein said step of providing a threshold includes calculating, by the OLT, a threshold for each sub-queue, and transmitting said threshold to said ONU.

3. The method of claim 2, wherein said calculating a threshold for each sub-queue includes multiplying said desired grant length by a class ratio of said each sub-queue and by a calibration factor.

4. The method of claim 3, wherein said threshold is an adaptive threshold, and wherein said transmitting is followed by counting, by the OLT, of bytes transmitted from each said sub-queue, adding said counted bytes to a total bytes counted variable, checking a difference between measured and expected class ratios, and based on said checking, adjusting said threshold.

5. A method for setting a threshold for dynamic bandwidth allocation in a passive optical network that includes an optical line terminal (OLT) and a plurality of optical network units (ONUs), the method comprising the steps of:
   a. providing a weighted fair queuing configuration to the OLT; and
   b. by the OLT, granting an ONU a grant with a desired grant length while providing to the ONU a threshold based on said weighted fair queuing configuration, wherein the threshold is for distinguishing packets to be sent from the ONU to the OLT in response to the grant from packets to be retained in the ONU in response to the grant.

6. A method for setting a threshold for dynamic bandwidth allocation in a passive optical network that includes an optical line terminal (OLT) and a plurality of optical network units (ONUs), the method comprising the steps of:
   a. providing a weighted fair queuing configuration to the OLT; and
   b. by the OLT, providing to an ONU a threshold based on said weighted fair queuing configuration while granting a grant with a desired grant length;
   wherein said step of providing a threshold includes calculating, by the OLT, a threshold for each sub-queue, and transmitting said threshold to said ONU; and
   wherein said calculating a threshold for each sub-queue includes multiplying said desired grant length by a class ratio of said each sub-queue and by a calibration factor.

* * * * *

UNITED STATES PATENT AND TRADEMARK OFFICE
CERTIFICATE OF CORRECTION

| | | |
|---|---|---|
| PATENT NO. | : 7,920,593 B2 | |
| APPLICATION NO. | : 12/058711 | |
| DATED | : April 5, 2011 | |
| INVENTOR(S) | : Onn Haran et al. | |

It is certified that error appears in the above-identified patent and that said Letters Patent is hereby corrected as shown below:

Column 12, claim 5:

Line 38 should be corrected as follows:
change

-- b. by the OLT, granting an ONU a grant with a desired grant -- to

"by the OLT, granting a grant with a desired grant"

Column 12, claim 5:

should be corrected as follows:

Line 40 should be corrected as follows:
change

-- said weighted fair queuing configuration, wherein the -- to

"said weighted fair queuing configuration, that depends on the desired grant length; wherein the"

Signed and Sealed this
Fourteenth Day of June, 2011

David J. Kappos
*Director of the United States Patent and Trademark Office*